Patented July 29, 1930

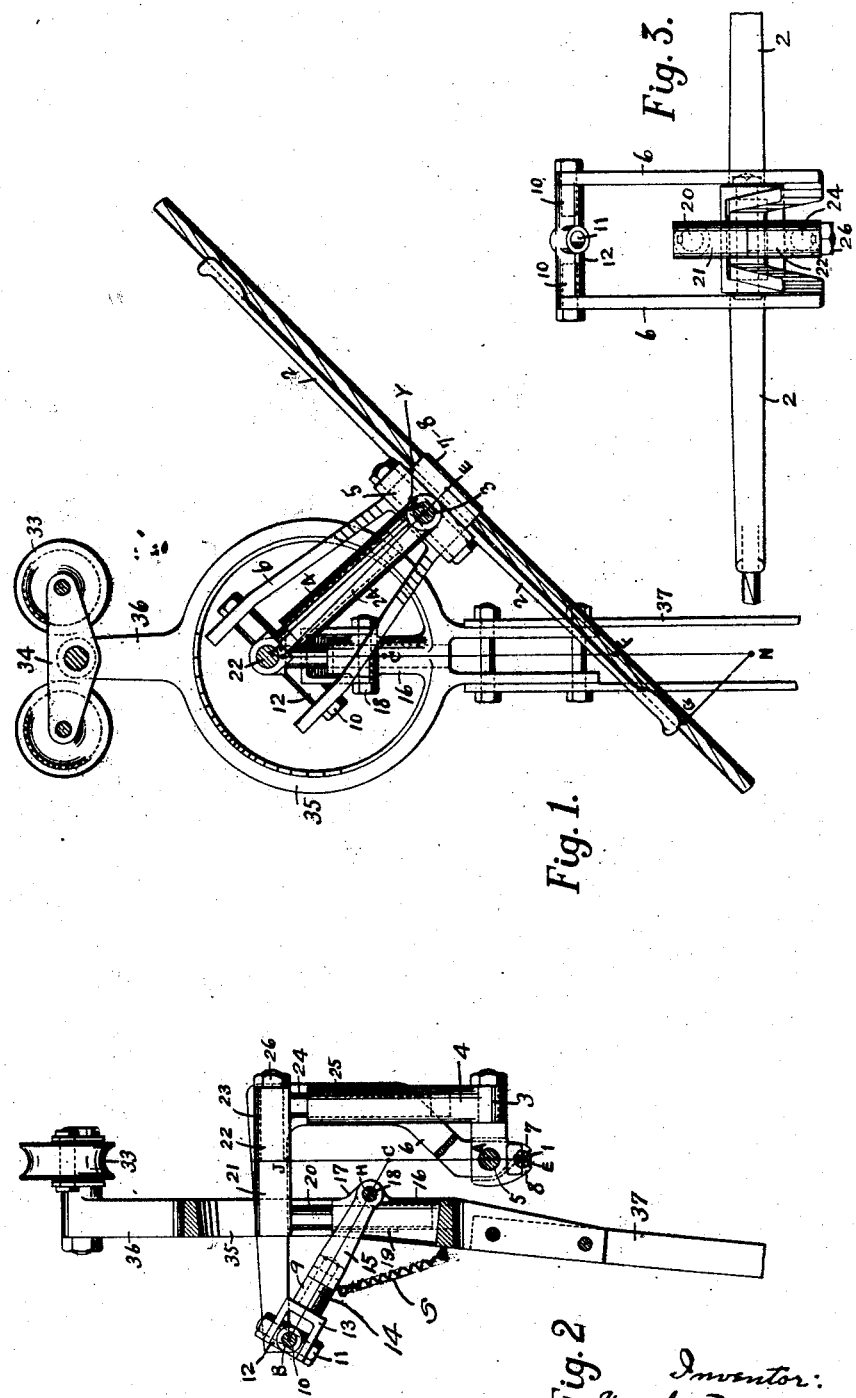

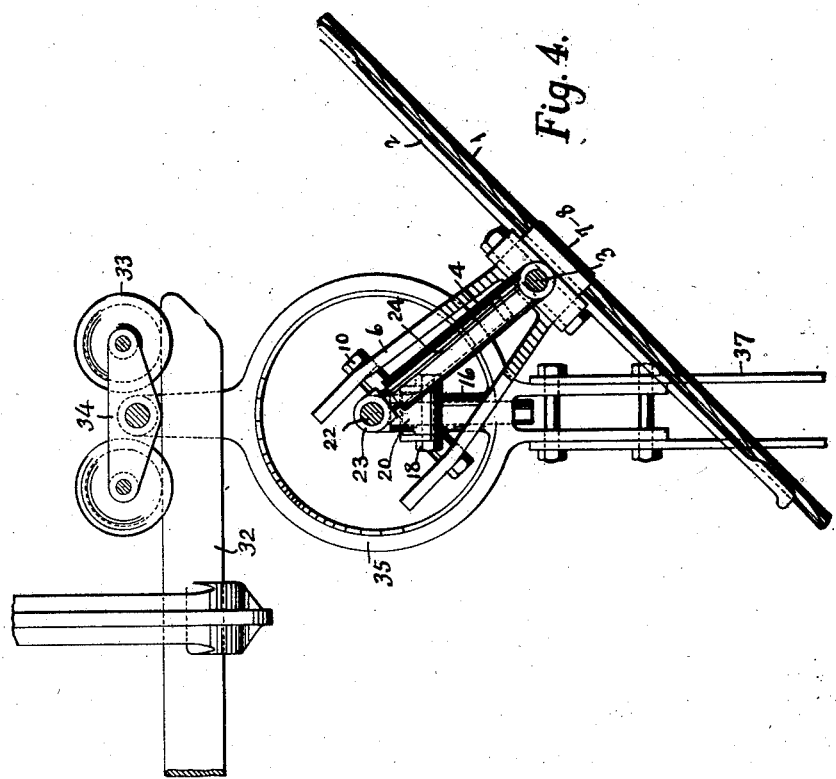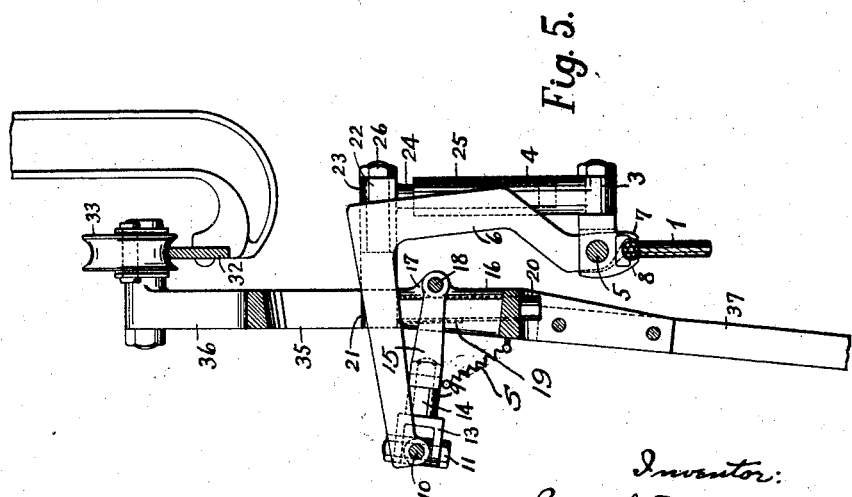

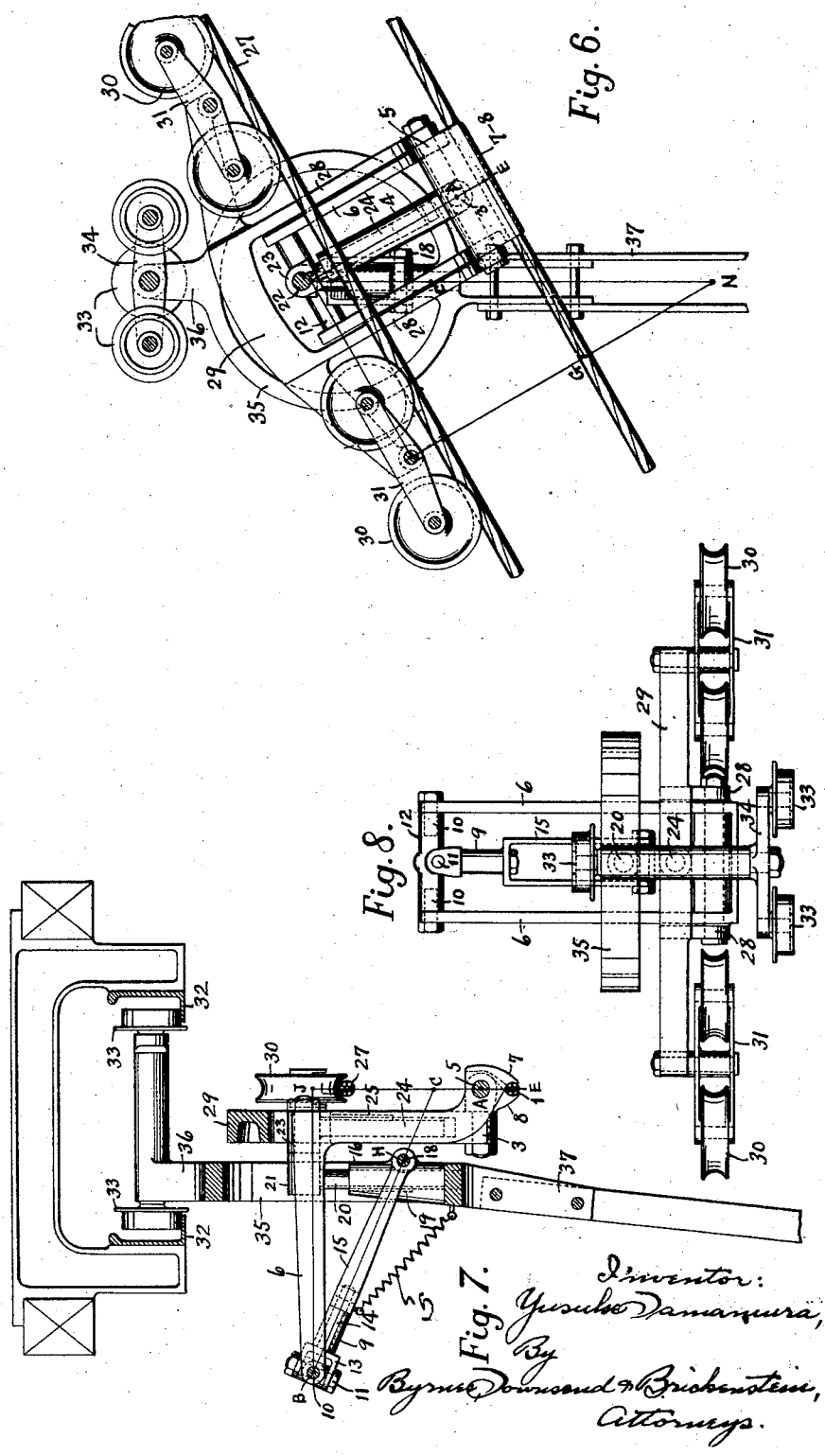

1,771,469

UNITED STATES PATENT OFFICE

YUSUKE TAMAMURA, OF TOKYO-FU, JAPAN

CLIP FOR THE ROPEWAY CAR OR THE LIKE

Application filed March 31, 1928, Serial No. 266,291, and in Japan April 7, 1927.

This invention relates to improvements in clips for rope-way cars and the like, and has for its object to provide a clip which will grip the rope with sufficient force to prevent the car from sliding, no matter what may be the inclination of the rope.

As will be more particularly described in connection with the accompanying drawings, the clip may comprise, in its preferred form, a hook bar to which the car or load is attached and of which the upper portion is preferably formed into an annular ring provided with a station landing device including a carriage and wheels for use when the car and clip are at rest, a suspension cylinder attached to the bottom portion of the inner side of the annular ring and extending vertically inward therefrom, a suspension rod slidably mounted in the suspension cylinder, a clevis axle and sleeve pivotally mounted upon the suspension cylinder, a lever arm or pair of lever arms actuated by the clevis axle and sleeve, a horizontal shaft carried by the suspension rod, a wing rod slidably mounted in a wing cylinder which is perpendicular to the horizontal shaft and a pair of pivoted jaws one of which is substantially stationary and is integral with a wing and the other of which is movable about their common pivot and is actuated by said lever arm or arms so as to grip the hauling rope when the car and clip are suspended therefrom, and to release the hauling rope when car and clip are in a station.

The details of the clip as arranged according to this invention will now be described more particularly with reference to the accompanying drawings.

Figure 1 is a front view of a clip arranged according to my invention, the clip being in a closed position.

Figure 2 is a side view of the same.

Figure 3 is a plan view partly in section.

Figure 4 is a front view of the clip in an open position.

Figure 5 is a side view of the same.

Figures 6, 7 and 8 are front, side and plan views of the clip applied to a double rope system.

Referring now more particularly to the drawings, as shown in Figures 1 to 5, the wing 2 is arranged to fit along the upper side of the hauling rope 1 and is pivotally connected to the wing cylinder 4 by means of the wing pin 3 which passes through the wing center Y. Y is a point on the line of intersection of the plane of the hauling rope 1 and the plane perpendicular to the wing 2. The wing 2 and a pair of lever arms 6 are pivotally connected by the head pin 5 which passes through the wing center Y and is parallel to the wing 2. The hauling rope 1 is gripped by the co-operation of the movable jaw 7 which is integral with the lever arms 6 and the stationary jaw 8 which is integral with the wing 2.

B is a point on the axis of the sleeve 9 which is set in an inclined position in the plane of the suspension rod 20 and which extends to the suspension center C. C is a point on the line of intersection of the plane of the hauling rope and that of the suspension rod 20, both set vertically and intersecting at right angles. At the center B there is arranged the cross bearing 12 which receives the tail axle 10 and intermediate axle 11 perpendicular to the axle 10. The tail axle 10 is arranged at the tail end of the lever arm 6, and is parallel to the pin 5. A clevis member 13 is pivoted by means of the intermediate axle 11 to the cross bearing 12 and a clevis axle 14 is rotatably mounted in the sleeve 9.

Both ends of the bifurcated member 15 which projects from the sleeve 9 are pivotally connected to the projection 17 of the suspension cylinder 16 by means of the pin 18 perpendicular to the plane of the suspension rod, so that the clevis axle 14 will swing vertically.

The suspension rod 20 is integral with the horizontal shaft 21 and is slidably inserted into the suspension cylinder 16 and prevented from revolving therein by means of the key 19. The shaft 21 carries the axle 22 which is perpendicular to the plane of the hauling rope 1. The sleeve 23 mounted on the axle 22 is provided with the downwardly extending wing rod 24, which is slidably inserted into the wing cylinder 4. Rotational movement thereof is prevented by the key 25, provided on the inner surface of the cylinder. The sleeve 23 is fixed on the axle 22 by means of the nut 26.

The clip includes, in addition to the foregoing elements, an annular ring 35, (Figures 1 and 4) having the suspension cylinder 16 projecting inwardly from the lower portion thereof. A hook bar 37 extends downwardly from the annular ring, and is adapted to support the receptacle or other load. The upper portion 36 of the annular ring carries an arm 34 provided with wheels 33 which form a carriage adapted to run on the rails 32 of stations or the like.

The manner of operation of a clip embodying my invention will have appeared from the foregoing description, but may be briefly described as follows. Suppose the car is at rest at a station, and its weight is supported from the rails 32 (Figure 4). There is a rigid connection from the wheels 33 through the member 36, the annular ring 35 and the hook bar 37, to the receptacle or load. The jaws 7 and 8 will be opened, since the spring S will contract and swing the sleeve 9 downwardly into a substantially horizontal position (Figure 5). The lever arms 6 are thus operated to swing the jaw 7 away from the jaw 8, about their common pivot 5. It now being desired to set the car in motion, it is pushed along the rail 32 until the end of the wing 2 meets the moving hauling rope 1. The apparatus will then rotate about the pivots 22 and 14 until the clip lies wholly along the upper side of the hauling rope, whatever may be the inclination of the latter. The hauling rope, because of its tension, will then exert an upward pressure upon the wing 2 and consequently upon the jaws 7 and 8. This will telescope the wing cylinder 4 along the wing rod 24 (Figure 5) and will soon slide the suspension rod 20 increasingly farther out of the suspension cylinder 16 (Figure 2). The result is that the pivot 18 of the bifurcated member 15 moves downward in relation to the horizontal shaft 21, and approaches the jaw pivot 5, (see Figure 2). This relative movement of the suspension cylinder 16 and suspension rod 20 operates to rotate the lever arms 6 about the pivot 5 by means of the sleeve 9 and bifurcated member 15, which are brought to an inclined position (Figure 2). The jaw 7 is thus made to approach the jaw 8, and the hauling rope 1 is gripped between them. When the car comes to a station the weight is taken by the wheels 33; the hauling rope no longer exerts an upward pressure; and the reverse operation takes place, so that the jaws cease to grip the hauling rope.

Clips of the foregoing type are to be utilized in the single rope system, while clips of the type shown in Figures 6 to 8 are for use in the double rope system. In the double rope system the construction of the wing is varied. In order to cover the carrying rope indirectly, the wing 2, carried by the wing pin 3 and jaw pin 5, is shortened and is provided with a pair of suspension levers 28 which are perpendicular to the wing 2, and which extend upwardly in a plane perpendicular to the wing. The upper ends of the suspension levers 28 are rigidly connected to the main carriage 29, parallel to the pin 5. A pair of wheels, 30, are arranged on each side of the main carriage 29 and rotate on the carrying rope which is stretched parallel to and over the hauling rope. The wheels may be held either directly by the main carriage, or indirectly by the auxiliary carriage 31, so that the length of the main carriage will correspond to that of the wing in the single rope system, thereby keeping the clip in equilibrium.

As above mentioned in connection with the description of clips for use on the single rope system, in a clip arranged for use on the double rope system the carriage and wheels which move on the carrying rope of the double rope way system form a part of the clip. The upper portion of the hook bar 37 is formed into the annular ring 35, from the bottom of which extends vertically the suspension cylinder 16. The top of the ring 35 is formed into the arm 36 on which is arranged the carriage 34 for supporting the wheels 33.

When the car suspended upon the hauling rope proceeds into a station safely, if the auxiliary wheel 33 is caused to revolve upon the suspension rail 32 arranged in the station, the distance between the hauling rope 1 and the suspension rail is progressively increased and the suspension center C will be raised so that while the sleeve 9 is made to lie horizontal, the movable jaw 7 is thrown out of the gripping position, and the hauling rope 1 will be disengaged or released.

The car which once disengages the hauling rope 1 runs on the rail in the station, and when it is to be started again, in the single rope system, it is only necessary to move the end of the wing 2 into contact with the hauling rope 1, and by the inertia of propulsion the total length of the wing covers the hauling rope. Similarly in the double rope system, the main carriage 29 of the wheel 30 is parallel to the carrying rope 27, and upon gripping the hauling rope in the clearance between the two jaws compresses the lever arm 6 upwardly.

The mechanism of the clip according to this invention superior to others is the suspension rod 20 and wing rod 24 engaged by the shaft 21 and axle 22. These rods are like a compass in the front view and like a clamp in the side view. These rods are inserted into respective cylinders and kept from revolving by means of keys. The suspension rod is operated by the load to be applied to the suspension hook 37 and kept always vertical notwithstanding the variation of the inclination of the hauling rope.

I claim:

1. A clip for the rope way car or the like comprising a wing arranged to fit along the upper side of the hauling rope and pivoted to a wing cylinder, a pair of pivoted jaws one of which is substantially stationary and integral with the wing and the other of which is integral with a lever arm and movable about their common pivot, a wing rod and a suspension rod slidably mounted in the wing cylinder and a suspension cylinder respectively, a clevis axle with a sleeve, the bifurcated end of which is pivotally connected to the suspension cylinder and the clevis end is pivoted universally to the free end of the lever arm by a suitable means.

2. A clip for the rope way car or the like comprising a wing arranged to fit along the upper side of the hauling rope and pivoted to a wing cylinder, a pair of pivoted jaws one of which is substantially stationary and integral with the wing and the other of which is integral with a lever arm and movable about their common pivot, a wing rod and a suspension rod slidably mounted in the wing cylinder and the suspension cylinder respectively, a horizontal shaft which is a common perpendicular of the suspension rod and the wing rod, a clevis axle with a sleeve, the bifurcated end of which is pivotally connected to the suspension cylinder and the clevis end is pivoted universally to the free end of the lever arm.

3. A clip for the rope way car or the like comprising a wing arranged to fit along the upper side of the hauling rope and pivoted to a wing cylinder, a pair of pivoted jaws one of which is substantially stationary and integral with the wing and the other of which is integral with a lever arm, a hook bar the upper portion of which is annexed to an annular ring, a suspension cylinder attached to the inner bottom of the annular ring and extending vertically therefrom, a suspension rod in said suspension cylinder and carrying a horizontal shaft, a wing cylinder carrying a wing rod and arranged perpendicularly to said horizontal shaft, said wing rod and suspension rod being slidably mounted in the wing cylinder and the suspension cylinder respectively and prevented from revolving therein by means of keys, a clevis axle with a sleeve, the bifurcated end of which is pivotally connected to a projection of the suspension cylinder and the clevis end is connected to the free end of the lever arm by a joint permitting angular movement about three intersecting axes.

4. A clip for the rope way car or the like comprising a wing arranged to fit along the upper side of the hauling rope and pivoted upon a wing cylinder, a pair of pivoted jaws one of which is substantially stationary and integral with the wing and the other of which is integral with a lever arm and movable about their common pivot, a hook bar the upper portion of which is annexed to an annular ring provided upwards with a station landing device including a carriage and wheels, a suspension cylinder attached to the inner bottom of the annular ring and extending vertically therefrom, a suspension rod in said suspension cylinder and carrying a horizontal shaft, a wing cylinder carrying a wing rod and arranged perpendicularly to said horizontal shaft, said wing rod and suspension rod being slidably mounted in the wing cylinder and the suspension cylinder respectively and prevented from revolving therein by means of keys, a horizontal shaft integral with the suspension rod and providing an axle upon which a sleeve integral with the wing rod is rotatably mounted, a clevis axle with a sleeve, the bifurcated end of which is pivotally connected to a projection of the suspension cylinder and the clevis end is connected to the free end of the lever arm by a joint permitting angular movement about three intersecting axes.

In testimony whereof, I affix my signature.

YUSUKE TAMAMURA.